United States Patent
Moore et al.

(10) Patent No.: US 8,527,364 B2
(45) Date of Patent: Sep. 3, 2013

(54) VARIABLE MONTH CROSS-PLATFORM PHOTO CALENDAR BUILDER

(75) Inventors: Ryan Moore, West Henrietta, NY (US); Jonathan Nick, Penfield, NY (US); Mike Anello, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 1410 days.

(21) Appl. No.: 11/619,469

(22) Filed: Jan. 3, 2007

(65) Prior Publication Data

US 2008/0162303 A1 Jul. 3, 2008

Related U.S. Application Data

(60) Provisional application No. 60/776,534, filed on Feb. 24, 2006.

(51) Int. Cl.
*G06Q 30/00* (2012.01)

(52) U.S. Cl.
USPC .................... 705/26.5; 705/26.1; 705/27.1

(58) Field of Classification Search
USPC ...................................................... 705/26, 27
See application file for complete search history.

(56) References Cited

U.S. PATENT DOCUMENTS

| | | | |
|---|---|---|---|
| 6,097,389 A | 8/2000 | Morris et al. | |
| 6,553,363 B1 * | 4/2003 | Hoffman ............................ | 1/1 |
| 8,024,658 B1 * | 9/2011 | Fagans et al. ................. | 715/730 |
| 2002/0073214 A1 * | 6/2002 | Iinuma ......................... | 709/229 |
| 2003/0182210 A1 * | 9/2003 | Weitzman et al. .............. | 705/27 |
| 2004/0085578 A1 | 5/2004 | Quek et al. | |
| 2004/0268225 A1 * | 12/2004 | Walsh et al. ................ | 715/501.1 |
| 2005/0195214 A1 * | 9/2005 | Reid et al. ...................... | 345/611 |
| 2012/0109776 A1 * | 5/2012 | Fagans et al. ................ | 705/26.5 |

OTHER PUBLICATIONS

Cohen, Andrew; "Design presentation calendars in Windows with Calendar Creator Plus," Mar. 1993, Computer Shopper, v13n3p856(1), Dialog file 275 #01591605, 2pgs.*
Hindu: Free application hosting tool,: Apr. 12, 2004, FHIN, Dialog file 20 #34934416, 3pgs.*
Hayes, Jan et al.; "XML, the DNA of the Knowledge Management Evolution," Jan. 2005, Computers in Libraries, Dialog file 275 #02848547, 8pgs.*

* cited by examiner

*Primary Examiner* — Rob Pond
(74) *Attorney, Agent, or Firm* — Woods Oviatt Gilman LLP

(57) ABSTRACT

A system and method for ordering a print of a digitally represented still image on a calendar using a remote computer is provided. The system includes a remote computer connected to a photofinisher through a network. A computer readable medium is located on the photofinisher and has computer-executable instructions for performing the method that includes selecting an image using the remote computer and displaying the image in an image tray pane. A calendar workspace pane includes separate calendar image windows associated with each of the calendar pages. One of the images displayed in the image tray pane is associated with one or more of the calendar image windows. A calendar print order data file is established, which includes the association of the selected image with one or more of the calendar image windows. The computer-executable instructions are in HTML and JavaScript.

20 Claims, 15 Drawing Sheets

VARIABLE MONTH CROSS-PLATFORM PHOTO CALENDAR BUILDER

CROSS-REFERENCE TO RELATED APPLICATIONS

This application claims the benefit of U.S. Provisional Patent Application No. 60/776,534, filed on Feb. 24, 2006.

FIELD OF THE INVENTION

The present invention generally relates to a system and method for building a calendar using one or more digitally represented still images. In particular, the present invention relates to a web-based variable-month cross-platform photo building software application that is written in Hypertext Markup Language (HTML), or HTML and JavaScript. More particularly, the photo building software application is stored in a photofinisher and may be accessed and used by a remote computer through a network such as the Internet.

BACKGROUND OF THE INVENTION

In the field of web-based Internet software applications, the leading browsers conform to one or more of the several popular web-page enhancing coding standards, which allow a user to produce graphics that may be used to create a personal photo calendar, for example. Currently, the solution to building rich browser-based Internet application is to leverage and utilize a third-party development standard such as Flash, Java, and ActiveX. Since these technologies are not native to the leading web browsers, they all require the user to download and install browser components. However, the functionality of each of these third-party technologies may be limited due to the operating system of the computer being used to run the web-based software applications. This is particularly relevant to web-based calendar building applications.

One method of producing a photo calendar using digital images is disclosed in U.S. Patent Publication No. 2004/0085578 to Quek et al. According to the method described in the Quek reference, one or more digital images are stored in an image collection location and displayed in a first application window. One of the images displayed in the first application window is then selected and associated within a vacant calendar image field associated with a month included in the calendar. The selected digital image is subsequently displayed in the calendar image field in a second application window, which is separate and distinct from the first application window.

While the method described in the Quek reference allows a calendar to be built using one or more digital images, it suffers from a number of drawbacks and deficiencies. For example, the calendar building method in the Quek reference does not allow a user to view the available digital images and the vacant calendar image fields in a single application window. This arrangement makes it difficult to build a photo calendar since the user cannot view the digital images that have already been selected to be included in the calendar, thereby making it difficult to easily and efficiently move the digital photos into the vacant calendar image fields. In addition, it may be difficult for a user to avoid using unwanted duplicate digital photos in a single calendar. Moreover, the method in the Quek reference also makes it difficult for the user to arrange the digital photos in a specific order when building the calendar since the user is not able to see the digital images that have already been associated with a calendar image fields. These deficiencies may result in a reduced efficiency in building a photo calendar according to the method described in the Quek reference.

Another method for presenting digital images on a display is disclosed in U.S. Pat. No. 6,097,389 to Morris et al. In particular, the Morris reference discloses that one or more digital images are displayed in a first region of a display device, and a media container is displayed in a second region of the display device. The digital images may be moved to the second region by a dragging operation so that the digital images may be arranged in desired fashion in the media container. While the method disclosed in the Morris reference describes using first and second regions for establishing groups of digital images within a media container, the Morris reference does not teach or suggest the use of such an arrangement in building a calendar using one or more digital photographs.

Accordingly, there exists a need for a system and method that provides a web-based photo calendar building software that is fully supported by different operating systems and web browsers without having to download or install external software such as Flash, Java or ActiveX. Further, there exists a need for a method for efficiently building a calendar using one or more digital images. The present invention fills these needs as well as other needs.

SUMMARY OF THE INVENTION

In order to overcome the above stated problems, the present invention provides a method for ordering a print of at least one digitally represented still image on a calendar using a remote computer. The calendar may include a one or more calendar pages and the remote computer is connected to a photofinisher through a network.

The method includes selecting a digitally represented still image using the remote computer, and displaying the selected digitally represented still image in an image tray pane. A calendar workspace pane includes a calendar image window associated with each of the plurality of calendar pages. The selected digitally represented still image that is displayed in the image tray pane is associated with at least one of the plurality of calendar image windows by dragging the selected digitally represented still image to the calendar image window, and then dropping the selected digitally represented still image in the calendar image window. A calendar print order data file is established, which represents the association of the selected digitally represented still image with the at least one of the plurality of calendar image windows. The method also includes communicating the calendar print order data file to the photofinisher, wherein the photofinisher receives the calendar print order data file and produces the print of the digitally represented still image on the at least one of the plurality of calendar pages. In accordance with the present invention, the method is executed using instructions in Hypertext Markup Language (HTML), or in HTML and JavaScript.

The method may further include selecting a calendar format and selecting a starting month for the calendar. In addition, the association of the selected digitally represented still image displayed in the image tray pane with at least one of the plurality of calendar image windows may be performed using an interface selection device. The interface selection device may be used to associate the selected digitally represented still image displayed in the image tray pane with at least one of the plurality of calendar image windows by dragging the selected digitally represented still image to the at least one of the plurality of calendar image windows, and then dropping the selected digitally represented still image in the at least one of the plurality of calendar image windows.

The method may further include editing the selected digitally represented still image after the step of associating the selected data file with at least one of the plurality of calendar image windows. The editing may include rotating the selected digitally represented still image. The method may further include uploading the digitally represented still image from the photofinisher prior to the step of selecting the digitally represented still image using the remote computer, and selecting a delivery criteria, wherein the calendar print order data file includes the selected delivery criteria. Further, the method may include delivering the print of the digitally represented still image on the at least one of the plurality of calendar pages using the delivery criteria.

The present invention also includes a system for ordering a print of at least one digitally represented still image on a calendar, the calendar including at least one calendar page. The system comprises a remote computer and a photofinisher connected to the remote computer through a network. The photofinisher includes a processor programmed to allow a digitally represented still image to be selected using the remote computer and display on the remote computer the selected digitally represented still image in an image tray pane. The processor also allows the remote computer to display a calendar workspace pane including a calendar image window associated with the at least one calendar page. Further, the selected digitally represented still image displayed in the image tray pane is associated with the calendar image window by using the remote computer to drag the selected digitally represented still image to the calendar image window, and then drop the selected digitally represented still image in the calendar image window. A calendar print order data file is established that represents the association of the selected digitally represented still image with the calendar image window. The processor allows for the communication of the calendar print order data file from the remote computer to the photofinisher, wherein the photofinisher receives the calendar print order data file and produces the print of the digitally represented still image on the at least one calendar page. The processor is programmed to perform the above steps using instructions in Hypertext Markup Language.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein.

DETAILED DESCRIPTION OF THE INVENTION

Figure 1:
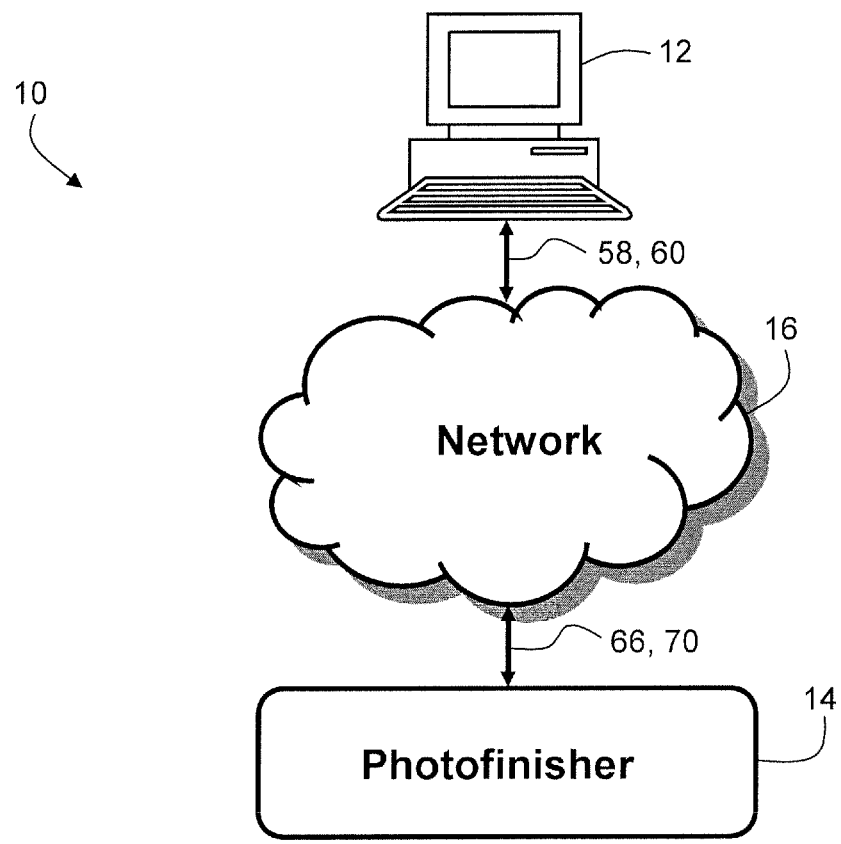
FIG. 1 generally illustrates a networking environment in which the present invention may be used.

With reference to the drawings, an exemplary environment or system for implementing the present invention is shown in FIG. 1 and is designated as reference numeral 10. The system 10 may include a general purpose computing device 12 that is remotely connected to a photofinisher 14 through a network 16, such as the Internet. In general, the present invention relates to an Internet-based calendar building software program written in Hypertext Markup Language (HTML), or a combination of HTML and JavaScript, which allows for the creation of a calendar including one or more digitally represented images selected by a customer or user. In particular, the customer may use a web browser located on remote computer 12 to access the software stored in a memory of photofinisher 14 through network 16 to create the calendar. The use of HTML and JavaScript allows the calendar building software program to be supported and run on different computer operating system platforms and hardware, which makes the software program of the present invention easier to use by eliminating the need to download and/or install external software such as Flash, Java, or ActiveX on remote computer 12 to run the software on the web browser. In addition, the present invention facilitates the efficient building of a digital photo calendar by providing application window environment that allows the user to view the selected digital images and available calendar image locations on a single application window, and allowing the digital images to be moved to the calendar image locations using a drag and drop operation. These aspects of the present invention will be appreciated in view of the description set forth below.

Figure 2:
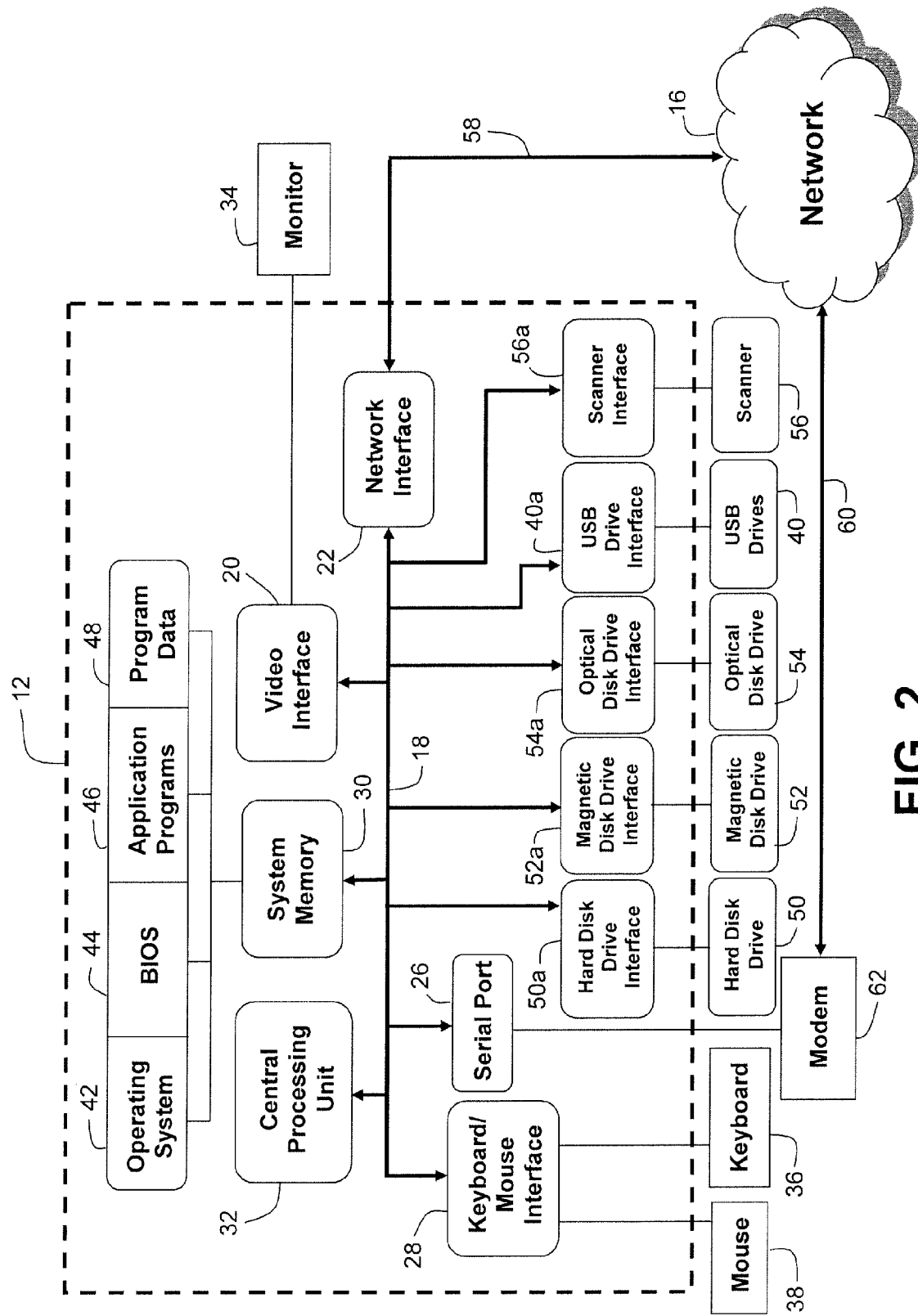
FIG. 2 is a block diagram generally illustrating a computing environment representing a remote computer.

As best seen in FIG. 2, remote computer 12 may be a personal computer including a system bus 18 that couples a video interface 20, network interface 22, one or more serial ports 26, a keyboard/mouse interface 28, and a system memory 30 coupled to a Central Processing Unit (CPU) 32. A monitor or display device 34 is coupled to bus 18 by video interface 20 and provides the user with a graphical user interface to view, edit, and prepare a print order data file, which will be discussed below, using the digitally represented still images. The graphical user interface allows the user to enter commands and information into remote computer 12 using a keyboard 36 and a user interface selection device 38, such as a mouse or other pointing device. Keyboard 36 and user interface selection device 38 are connected to bus 18 through keyboard/mouse interface 28. The display 34 and user interface selection device 38 are used in combination to form the graphical user interface which allows the user to use the software of the present invention. Other peripheral devices may be connected to remote computer 12 through serial port 26 or universal serial bus (USB) drives 40 to transfer information to and from remote computer 12. For example, cameras and camcorders may be connected to remote computer 12 through serial port 26 or USB drives 40 so that data representative of a digitally represented still image or video may be downloaded to system memory 30 or another memory storage device associated with remote computer 12 so that the images may be subsequently printed on a calendar by photofinisher 14 in accordance with the present invention.

The system memory 30 is connected to bus 18 and may include read only memory (ROM), random access memory (RAM), an operating system 42, a basic input/output system (BIOS) 44, application programs 46 and program data 48. The remote computer 12 may further include a hard disk drive 50 for reading from and writing to a hard disk, a magnetic disk drive 52 for reading from and writing to a removable magnetic disk (e.g., floppy disk), and an optical disk drive 54 for reading from and writing to a removable optical disk (e.g., CD ROM or other optical media). The remote computer 12 may also include USB drives 40 and other types of drives for reading from and writing to flash memory devices (e.g., compact flash, memory stick/PRO and DUO, SD card, multimedia card, smart media xD card), and a scanner 56 for scanning items such as still image photographs to be downloaded to remote computer 12. A hard disk drive interface 50*a*, a magnetic disk drive interface 52*a*, an optical disk drive interface 54*a*, a USB drive 40*a* interface and a scanner interface 56*a* operate to connect bus 18 to hard disk drive 50, magnetic disk drive 52, optical disk drive 54, USB drive 40 and a scanner 56, respectively. Each of these drive components and their associated computer-readable media may provide remote computer 12 with non-volatile storage of computer-readable instruction, program modules, data structures, application programs, an operating system, and other data for the remote computer 12. In addition, it will be understood that remote computer 12 may also utilize other types of computer-readable media in addition to those types set forth herein, such as digital video disks, random access memory, read only memory, other types of flash memory cards, magnetic cassettes, and the like.

Remote computer 12 may operate in a networked environment using logical connections with photofinisher 14. Network interface 22 provides a communication path 58 between bus 18 and network 16, which allows a calendar print order data file to be communicated through network 16 to photofinisher 14 after the calendar print order data file has been established. This type of logical network connection is commonly used in conjunction with a local area network (LAN). The calendar print order data file may also be communicated from bus 18 through a communication path 60 to network 16 using serial port 26 and a modem 62. A modem connection between the remote computer 12 and photofinisher 14 is commonly used in conjunction with a wide area network (WAN). It will be appreciated that the network connections shown herein are merely exemplary, and it is within the scope of the present invention to use other types of network connections between remote computer 12 and photofinisher 14 including both wired and wireless connections.

Figure 3:
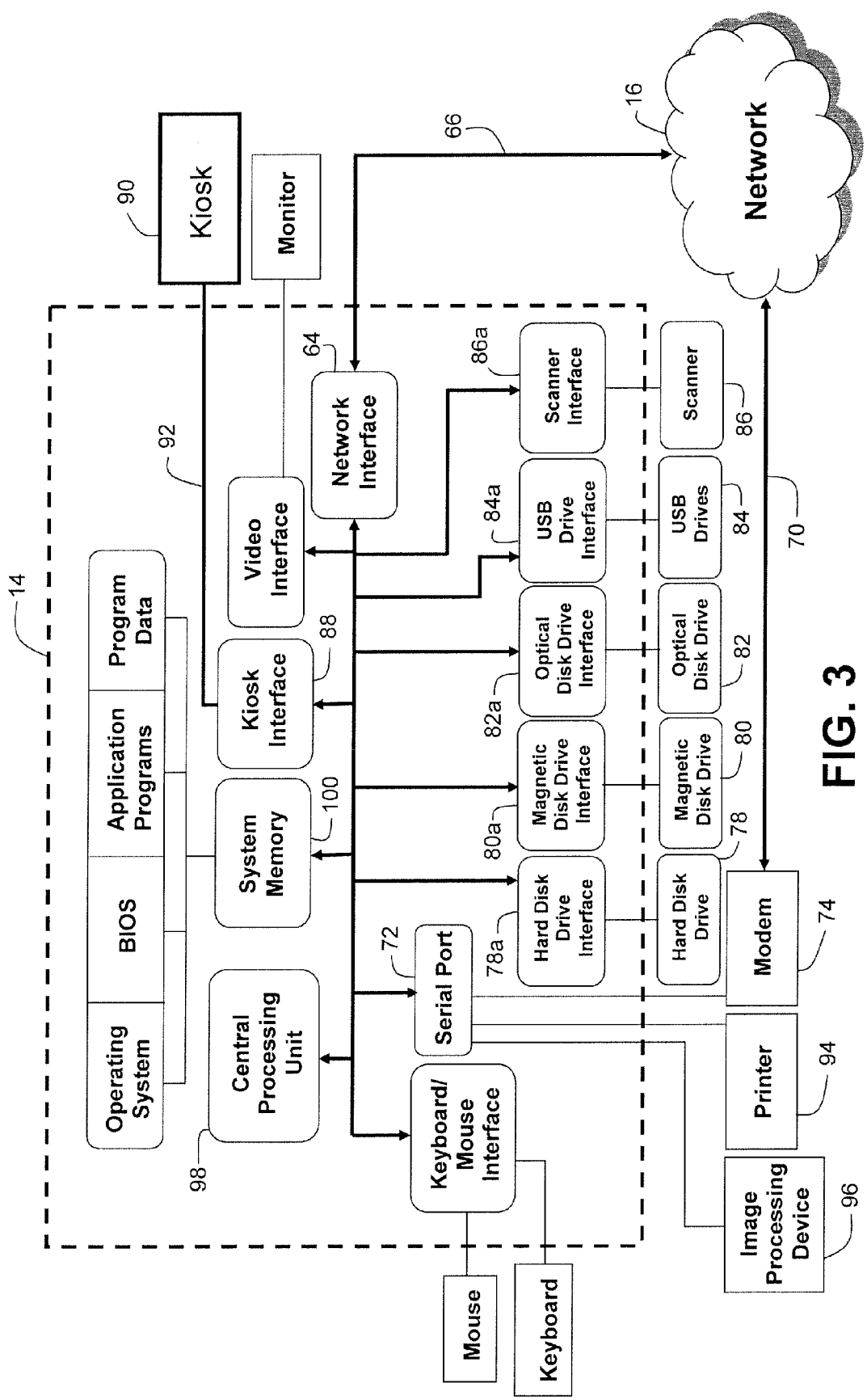
FIG. 3 is a block diagram generally illustrating a computing environment representing a photofinisher.

An exemplary photofinisher 14 is shown in FIGS. 1 and 3 and includes a network interface 64 that provides a communication path 66 between a bus 68 and network 16, which allows the calendar print order data file to be uploaded or otherwise communicated through network 16 to photofinisher 14 after the calendar print order data file has been established using remote computer 12. The calendar print order data file from remote computer 12 may also be communicated from bus 68 through a communication path 70 to network 16 using a serial port 72 and a modem 74. As mentioned above, it will be appreciated that the network connections shown herein are merely exemplary, and it is within the scope of the present invention to use other types of network connections between remote computer 12 and photofinisher 14 including wired and wireless connections.

With specific reference to FIG. 3, photofinisher 14 may also include a hard disk drive interface 78*a*, a magnetic disk drive interface 80*a*, an optical disk drive interface 82*a*, a USB drive 84*a* interface and a scanner interface 86*a*, which operate to connect bus 68 to a hard disk drive 78, a magnetic disk drive 80, an optical disk drive 82, USB drives 84 and a scanner 86, respectively. A Kiosk interface 88 may also connect a Kiosk 90 to bus 68 so that commands and data representative of a digitally represented digital image and/or a calendar print order file may be sent through a communication path 92. A printer 94 and an image processing device 96 are connected to bus 68 through serial port 72. After the calendar print order data file is uploaded to photofinisher 14 through network 16, a central processing unit (CPU) 98 may instruct printer 94 or image processing device 96 to produce the print of one or more of the still images on a print medium, such as separate pages of a calendar corresponding to the months of the year, or some other time increment. Printer 94 is generally used to print the one or more still images included in the calendar print order data file on paper medium representing the separate pages of the calendar. Image processing device 96 may be a device other than a standard printer that is used to print the still image in a calendar format on other types of medium that printer 94 cannot accommodate such as, but not limited to, posters, mugs, mouse pads, magnets, ornaments, plates, puzzles, and T-shirts. It will be understood that the calendar print order data file may be uploaded to Kiosk 90 using photofinisher 14 or network 16 so that the print order can be delivered using a specified delivery criteria.

Photofinisher 14 also includes a system memory or other computer readable medium 100 having computer-executable instructions written in HTML, and optionally JavaScript, stored therein for allowing the calendar building software to be used by a web browser on remote computer 12, through network 16, to print at least one digitally represented still image selected by the user on one or more pages of a calendar. Memory 100 may also be used to store the image data uploaded from remote computer 12 through network 16, from Kiosk 90, or through any of the components 78, 80, 82, 84, 86.

Figure 4:
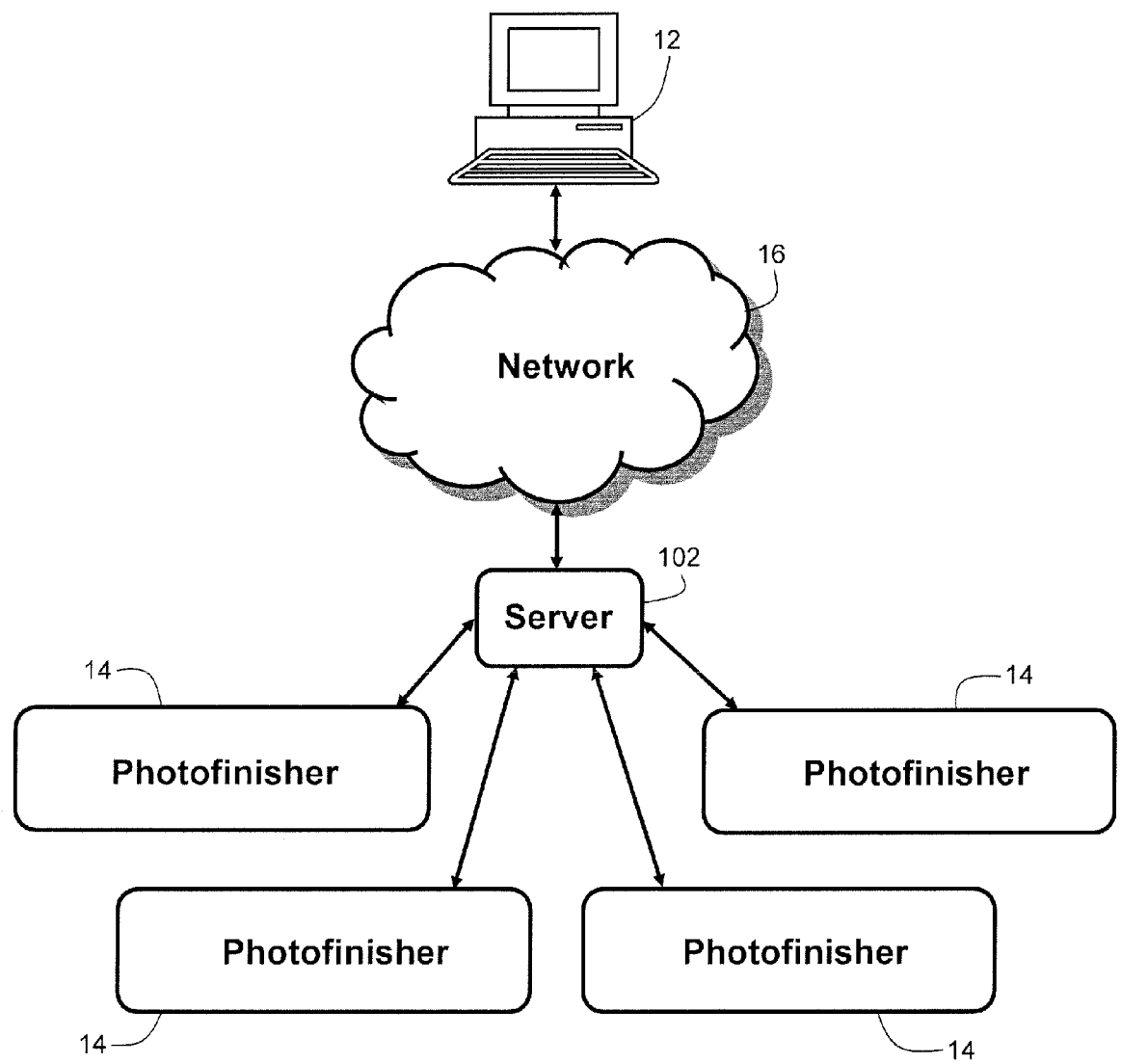
FIG. 4 generally illustrates another type of networking environment in which the present invention may be used.

As best seen in FIG. 4, the system and method of the present invention may be used in other networking environments including a server 102, wherein server 102 may be positioned in between a plurality of photofinishers 14 and network 16. Server 102 may operate as a router to allow access to the calendar building software stored in memory 100 of one or more of photofinishers 14 and direct the calendar print order data files originating from remote computer 12 to the photofinisher 14 designated by the user during the ordering process. In addition, server 102 may also include a memory for storing the computer-executable instructions written in HTML, or a combination of HTML and JavaScript, that allows remote computer 12 to access and run the calendar building software from server 102 instead of one of the photofinishers 14. The memory in server 102 may also provide a central storage location for all of the image data and calendar print order data files uploaded from remote computer 12 so that the capacity of system memory 100 of photofinisher 14 may be reduced.

In the system described herein, the computer readable medium in photofinisher 14 or server 102 has computer-executable instructions for performing a method for ordering a print of at least one digitally represented still image on a calendar using remote computer 12, wherein the calendar includes a plurality of calendar pages. As mentioned above, the computer-executable instructions may be web-based and exclusively written in HTML, or a combination of HTML and JavaScript, to create a rudimentary and cross-platformed calendar building software application that benefits from cross-browser support and eliminates the need to download and/or install external software such as Flash, Java, or ActiveX to run the software on the web browser located on remote computer 12. Further, the cross-platformed calendar building software is a calendar creation tool that allows the user to easily build a customized calendar by dragging and dropping one or more selected digital images from an image tray pane into a calendar image window that corresponds to one or more of the calendar pages.

As mentioned above, the cross-platformed calendar building software application is written in HTML, or in a combination of HTML and JavaScript. It will be understood that HTML is the coding language that is used to create web pages on the Internet that are interpreted by a web browser located on remote computer 12. HTML is generally compatible with any web browser or operating system located on remote computer 12. Further, JavaScript is a system of programming codes that may be embedded into the HTML of a web page to add functionality such as, but not limited to, responding to user actions such as button clicks or to run processes locally or validate data. JavaScript may be run and be interpreted by the web browser in remote computer 12 rather than on server 102 or photofinisher 14. JavaScript also allows for cross-browser support.

It will be understood that the method of the present invention in the form of executable commands or instructions may be stored on or otherwise embodied within any type of computer-readable medium on photofinisher 14 or server 102 including, but not limited to, floppy disks, conventional hard disks, read only memory (ROM), random access memory (RAM), flash memory, electrically erasable programmable read-only memory (EEPROM), magnetic cassettes, magnetic tape, magnetic disk storage or other magnetic storage devices, CD-ROM, digital versatile disks (DVD) or other optical disk storage, other types of memory, or any other medium which can be used to store the desired information and which can be accessed by the network 16 and remote computer 12.

Figure 5:
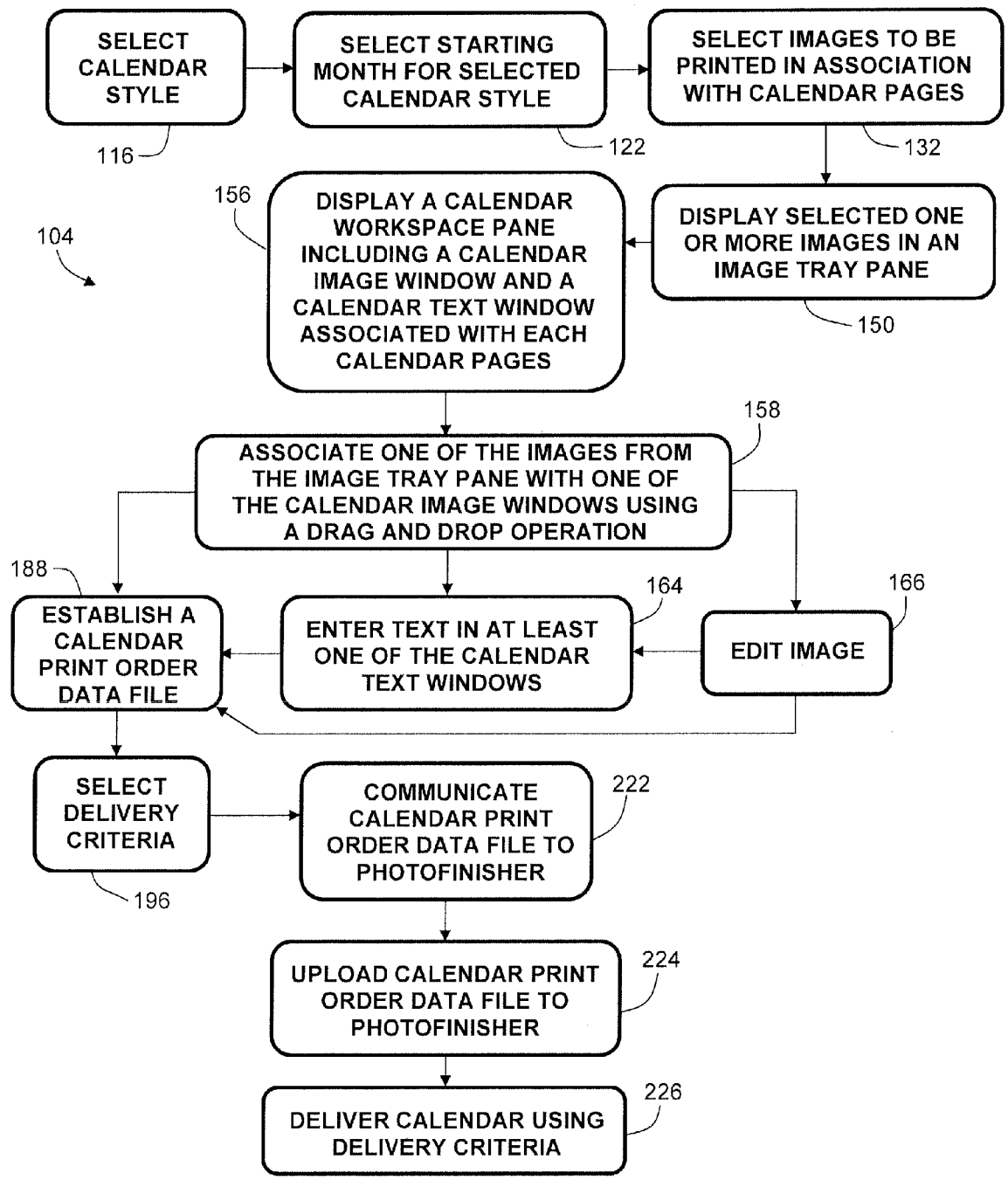
FIG. 5 is a flow chart illustrating a method in accordance with an aspect of the present invention.
Figure 6:
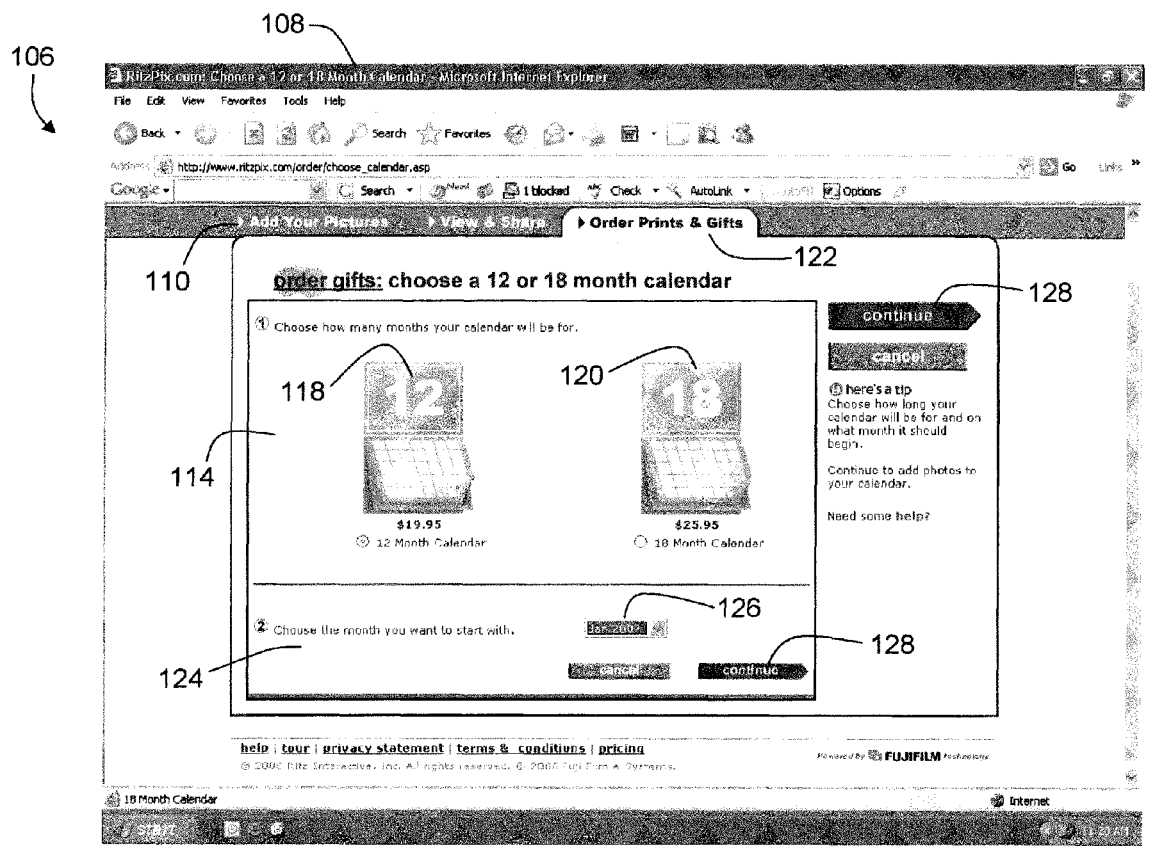
FIGS. 6-15 generally illustrate views displayed on the remote computer produced during implementation of a system and method for building a calendar in accordance with the present invention.

A method 104 that may be implemented by the web-based calendar building software 106 referred to above is shown in FIG. 5 and will be described with reference to the screen illustrations shown in FIGS. 6-15. As best seen in FIG. 6, the user may open a web browser 108 located on remote computer 12 and connects to photofinisher 14 and/or server 102 through network 16 to access calendar building software 106. At this point, the user may download, import or otherwise open at least one image data file that may be printed on the calendar using the "Add Your Pictures" mode 110, wherein each image data file represents a digitally represented still image. For example, the image data files may be selected, downloaded or imported from a memory location 30 located on remote computer 12, removable memory storage device (e.g., CD, floppy disk, flash drive) using drives 50, 52, 54, 40, 56, or another type of computer-readable medium having a memory.

After the image data files that will be used in building the calendar are downloaded, imported or otherwise opened using the "Add Your Pictures" function 110, an "Order Prints & Gifts" mode 112 may be selected in which one or more calendar style choices are displayed in a calendar style selection pane 114. At step 116, as best seen in FIGS. 5 and 6, the user then may select one of the calendar styles, including a twelve month calendar 118, eighteen month calendar 120, or a custom calendar length selected by the user. While each of the calendar pages may be associated with a month, it will be understood that the calendar pages may also be associated with other time frames such as, for example, two-month increments. At step 122, a starting month selection pane 124 is displayed and provides a drop down menu selection 126 that allows the user to select a starting month for the calendar (e.g., January 2007). It will also be understood that the total number of pages in the calendar may be equal to the total number of months in the calendar plus the cover of the calendar. After steps 116 and 122 have been completed, a continue button 128 enables an execution command that operates to proceed to the next step of the calendar building process.

Figure 7:
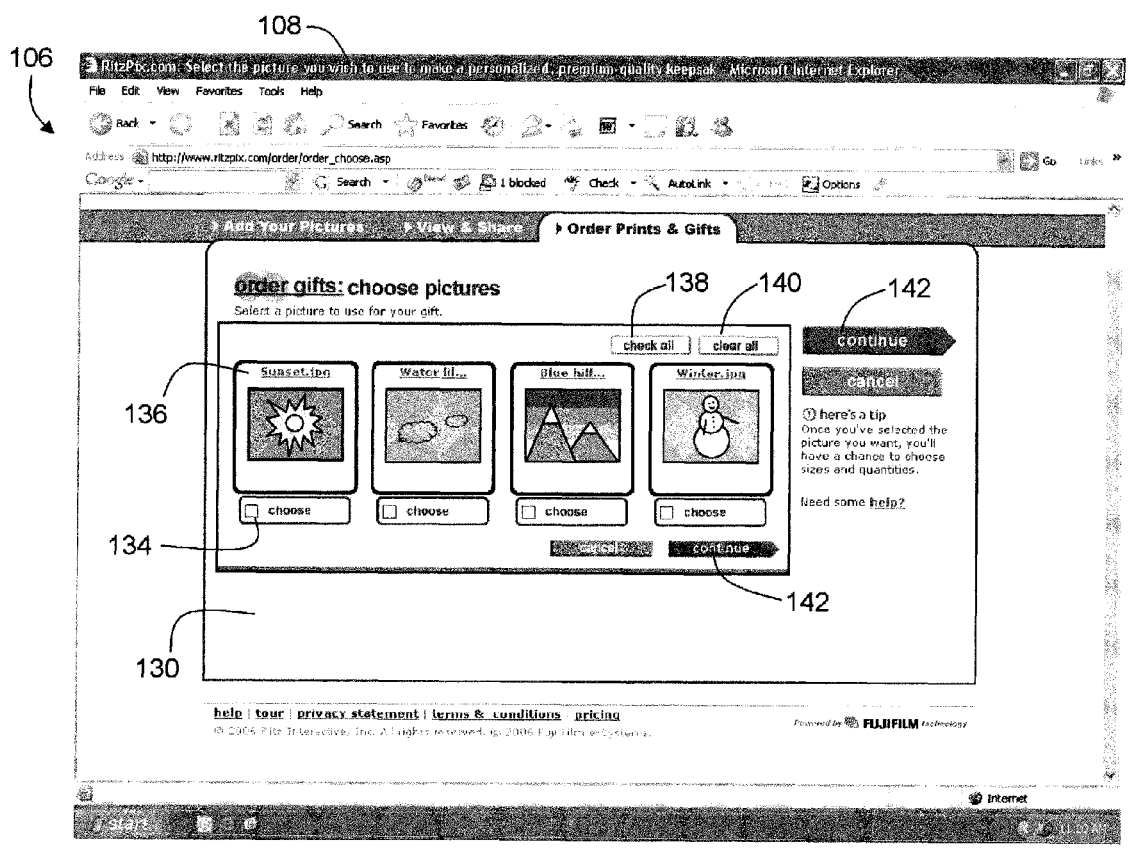

As best seen in FIGS. 5 and 7, an image selection pane 130 is displayed at step 132 and allows the user to select which images will be used in building and creating the calendar. Further, as best seen in FIG. 7, a selection box 134 is associated with each of the displayed images 136 that allows the user individually select which images will be used in building and creating the calendar, or a "Check All" button 138 enables an execution command that operates to select all of the images 136 displayed in image selection pane 130. A "Clear All" button 140 enables an execution command that operates to un-select all of the selected images in image selection pane 130. After one or more of images 136 have been selected at step 132, a continue button 142 enables an execution command that operates to proceed to the next step of the calendar building process.

Figure 8:
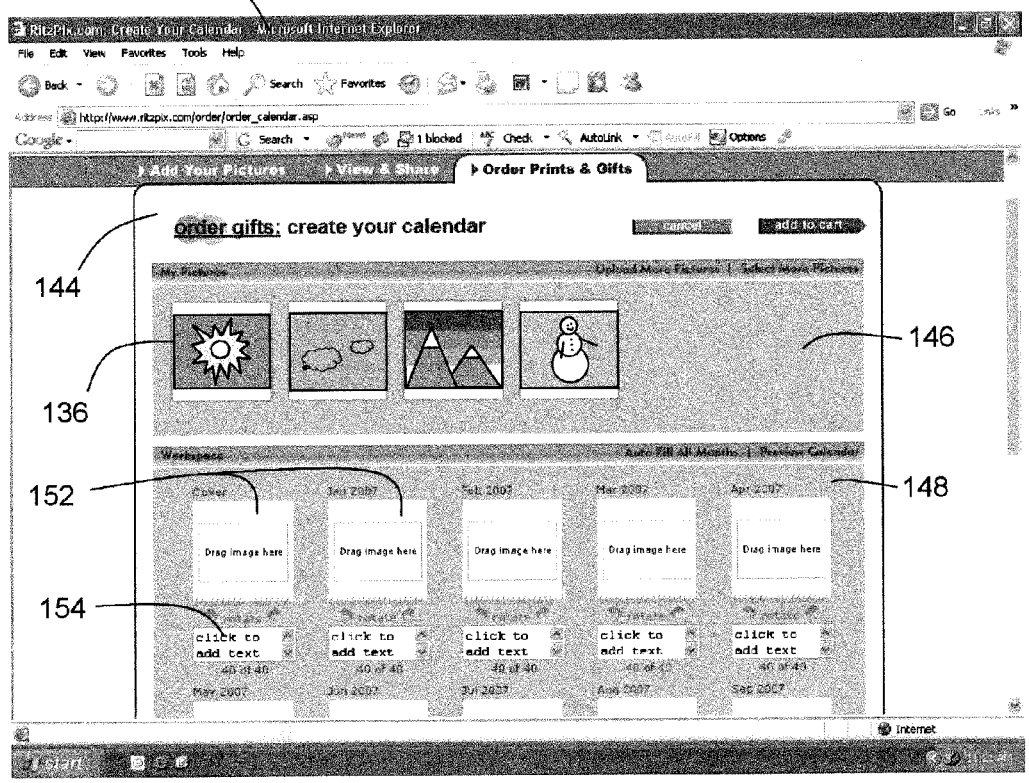
Figure 9:
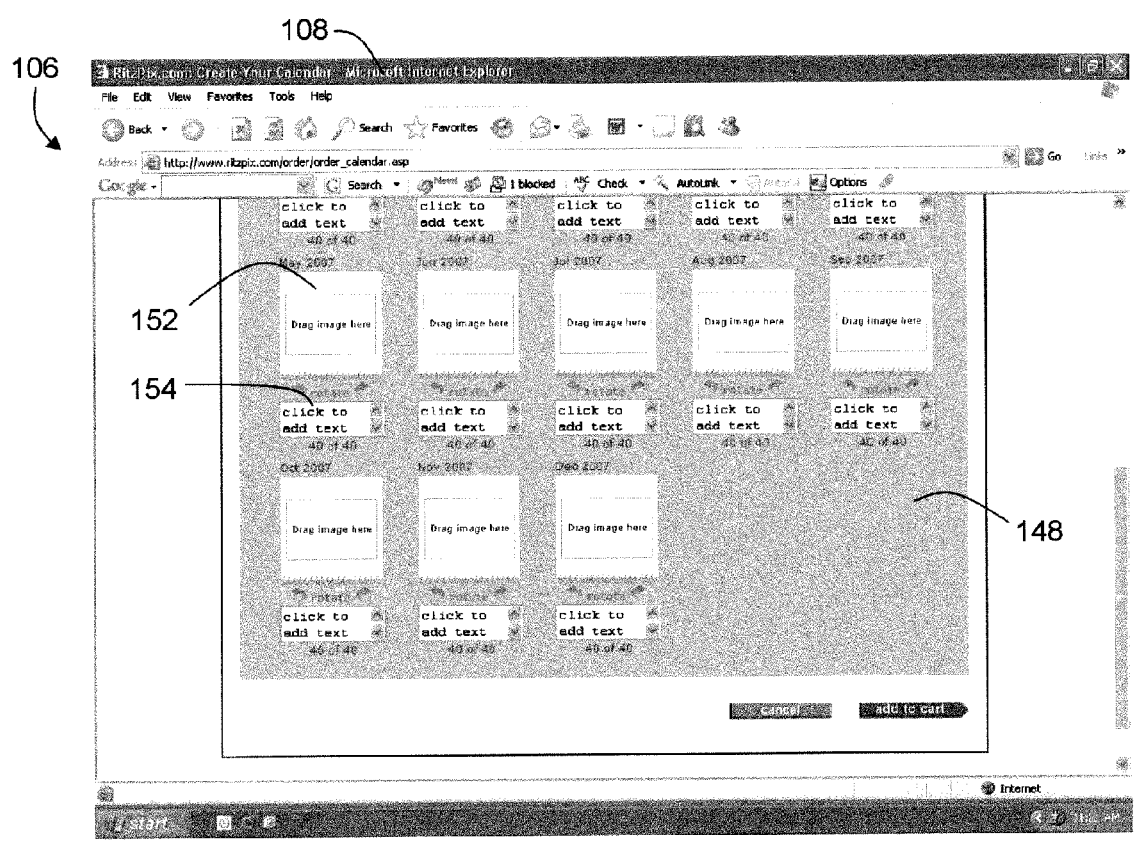
Figure 10:
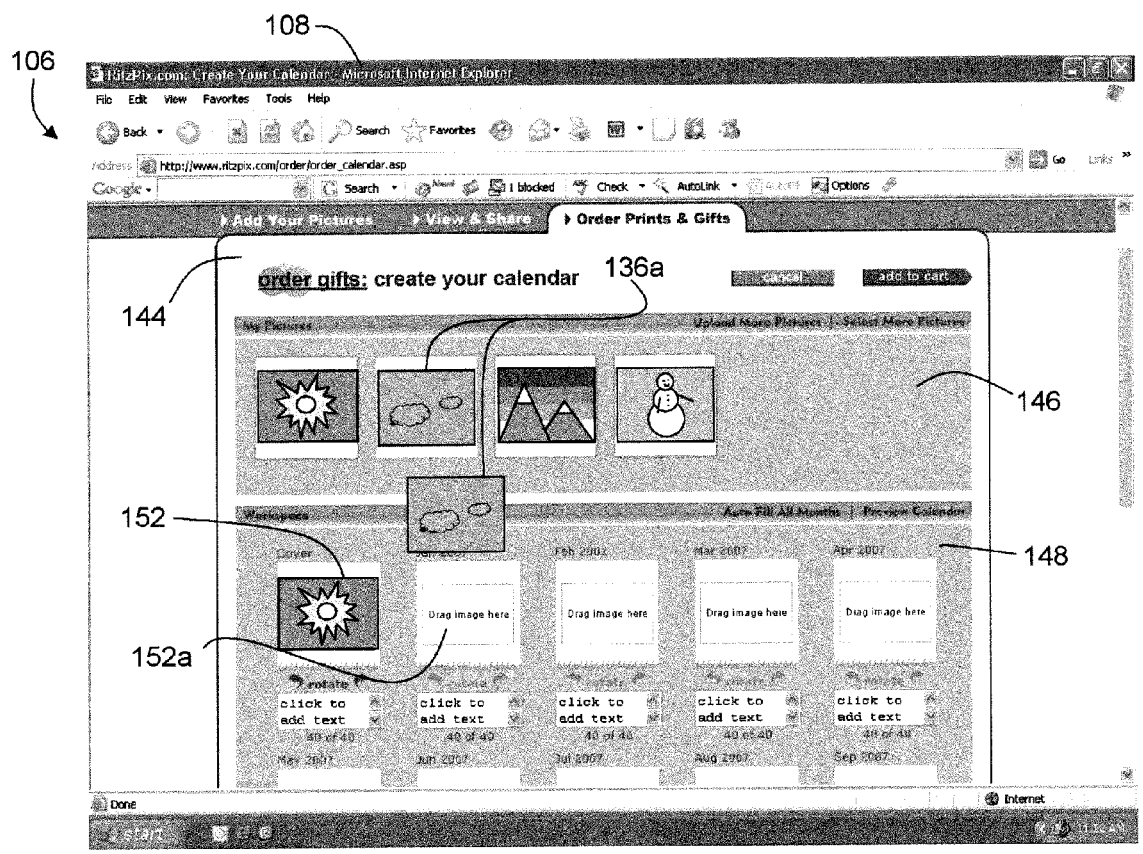

Next, as best seen in FIGS. 5 and 8, the user interface provided by the application is displayed on display device 34 in an application window and includes a calendar creation tool pane 144 having an image tray pane 146 and a calendar workspace pane 148. At step 150, the previously selected images are displayed in image tray pane 146 in a first region of display device 34. Also, with reference to FIGS. 8 and 9, the calendar workspace pane 148 is displayed in a second region of display device 34 and includes and displays a calendar image window 152 and a calendar text window 154 associated with each of the pages of the calendar (e.g., Cover, January 2007, February 2007, etc.) at step 156. Each of the calendar image windows 152 is a location where one of the displayed images 136 in image tray pane 146 may be placed so that selected image is printed or otherwise associated with a particular page of the calendar. For example, if an image is placed in the calendar image window 152 for January 2007, that image will be printed in the calendar so that the image may be seen along with the time frame associated with January 2007. It will be understood that the same image may be associated with one or more of the pages of the calendar. Calendar text window 154 is a location where characters such as text, numbers, symbols or the like may be placed so that the characters are printed in association with the respective page of the calendar. For instance, if text is placed in the calendar text window 154 for January 2007, that text will be printed in the calendar so that the text may be seen along with the time frame associated with January 2007.

Figure 11:
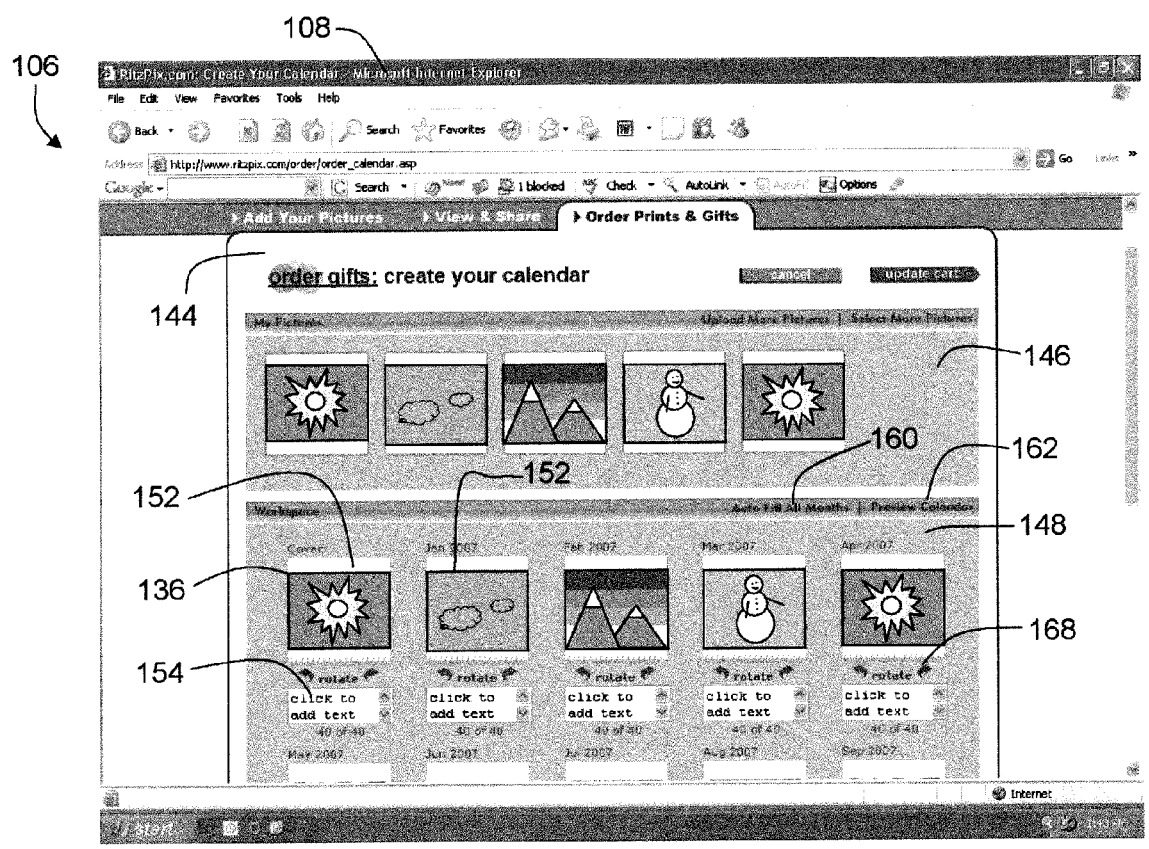
Figure 12:
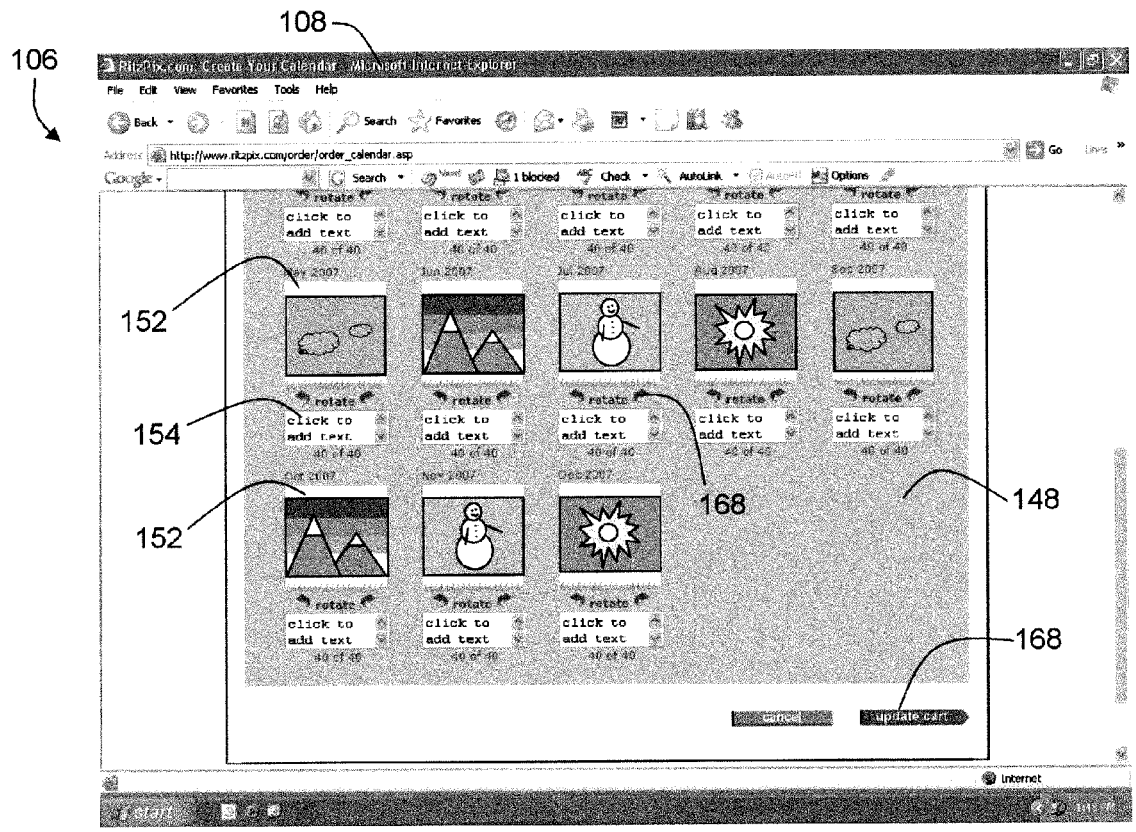

As mentioned above, and as best seen in FIG. 5, one or more of the images 136 displayed in image tray pane 146 may be associated with one of calendar image windows 152 using the interface selection device 38 at step 158. For example, with reference to FIG. 10, interface selection device 38 may be used to associate one of images 136a displayed in image tray pane 146 with at least one of the plurality of calendar image windows 152a by clicking on the selecting image 136a, dragging image 136a to one of calendar image windows 152a, and then dropping image 136a in the selected calendar image window 152a (i.e., a drag and drop operation). As best seen in FIGS. 11 and 12, this process may be repeated until all of calendar image windows 152 are occupied by one or more of images 136 located in image tray pane 146. With particular reference to FIG. 11, an "Auto Fill All Months" button 160 enables an execution command that operates to automatically fill all of the calendar image windows 152 with the images 136 in image tray pane 146 using a pre-established method within the calendar building software, such as, for example, a random fill method. Also, a "Preview Calendar" button 162 enables an execution command that operates to open a new window showing a preview of the calendar including the images and characters currently located in calendar image windows 152 and calendar text windows 154.

It will be understood that adding characters within calendar text window 154 is optional at step 164 and is not required to complete the calendar building process. In addition, after an image 136 is associated and positioned within one of calendar image windows 152 as shown in FIGS. 11 and 12, the image 136 may be edited at step 166. The editing of the images may include, but is not limited to, the rotation of the image using a "Rotate" button 168. Further, it will also be understood that the contrast, brightness, tone, and other picture characteristics may be modified at step 166. As best seen in FIGS. 5 and 12, a "Update Cart" button 168 enables an execution command that operates to proceed to the calendar order summary portion of the calendar building process.

Figure 13:
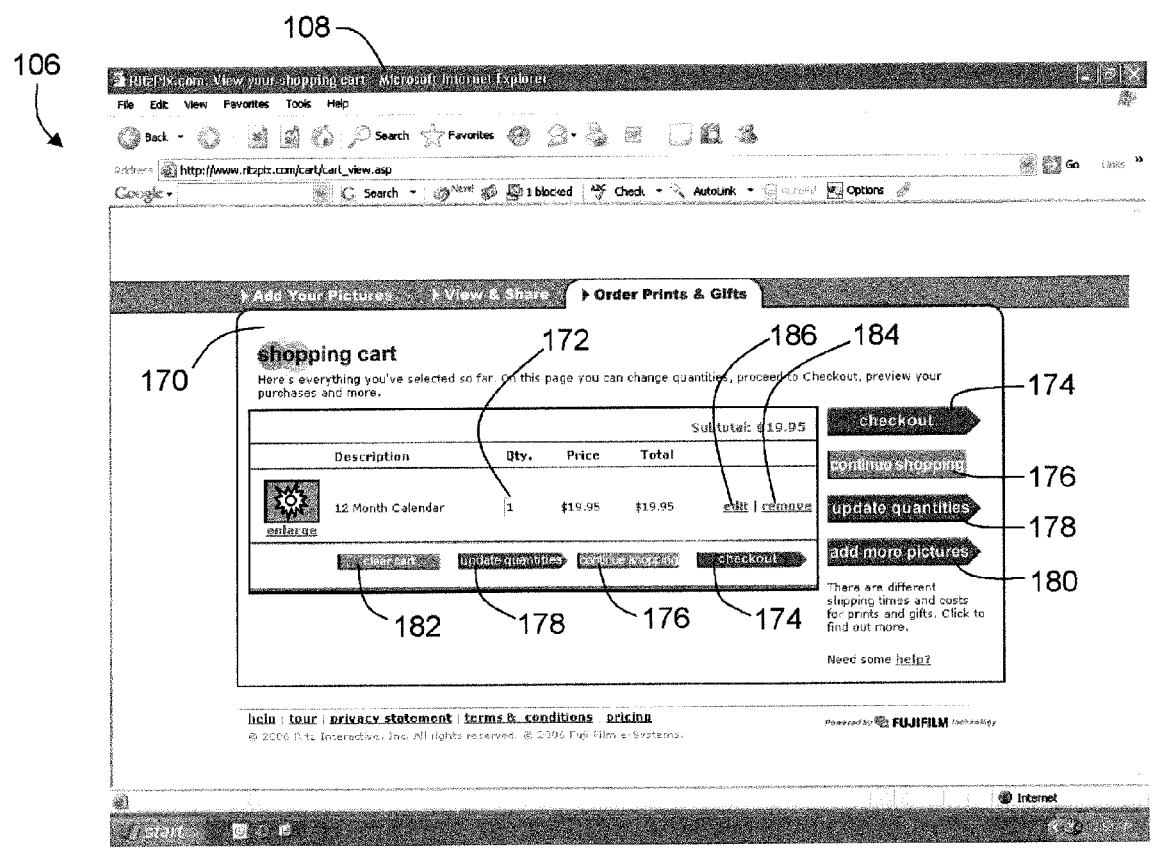

As best seen in FIG. 13, a description of the prepared calendar print order is shown in an order summary pane 170. The description may include the quantity or number of calendars 172 to be ordered using the configuration selected above, price per calendar, and total price of the order. The order summary pane 170 may also include one or more "Checkout" buttons 174, "Continue Shopping" buttons 176, "Update Quantities" buttons 178, an "Add More Pictures" button 180 and a "Clear Cart" button 182. The clear cart button 182 enables an execution command that operates to clear the calendar print order data file from order summary pane 170. A "Remove" button 184 enables a execution command that is similar to the clear cart button 182. An "Edit" button 186 enables an execution command that operates to return the method back to the calendar creation tool pane 144 shown in FIGS. 11 and 12 so that the calendar may be further edited before establishing the calendar print order data file. The add more pictures button 180 enables an execution command that operates to return the application to the "Add Your Pictures" function 110 (FIG. 6). The update quantities buttons 178 each enables an execution command that operates to update the total price and subtotal shown in the order summary pane 170 if the quantity or number of calendars 172 to be ordered has been modified. The continue shopping button 176 enables an execution command that operates to allow the user to configure another calendar or other types of products that images may be associated with, such as, but not limited to, regular photographic prints, greeting cards, mugs, T-shirts. The checkout button 174 enables an execution command that operates to establish the calendar print order data file at step 188 using the images and text associated with each of the calendar pages in calendar creation tool pane 144 and the quantity 172 listed in order summary pane 170.

Figure 14:
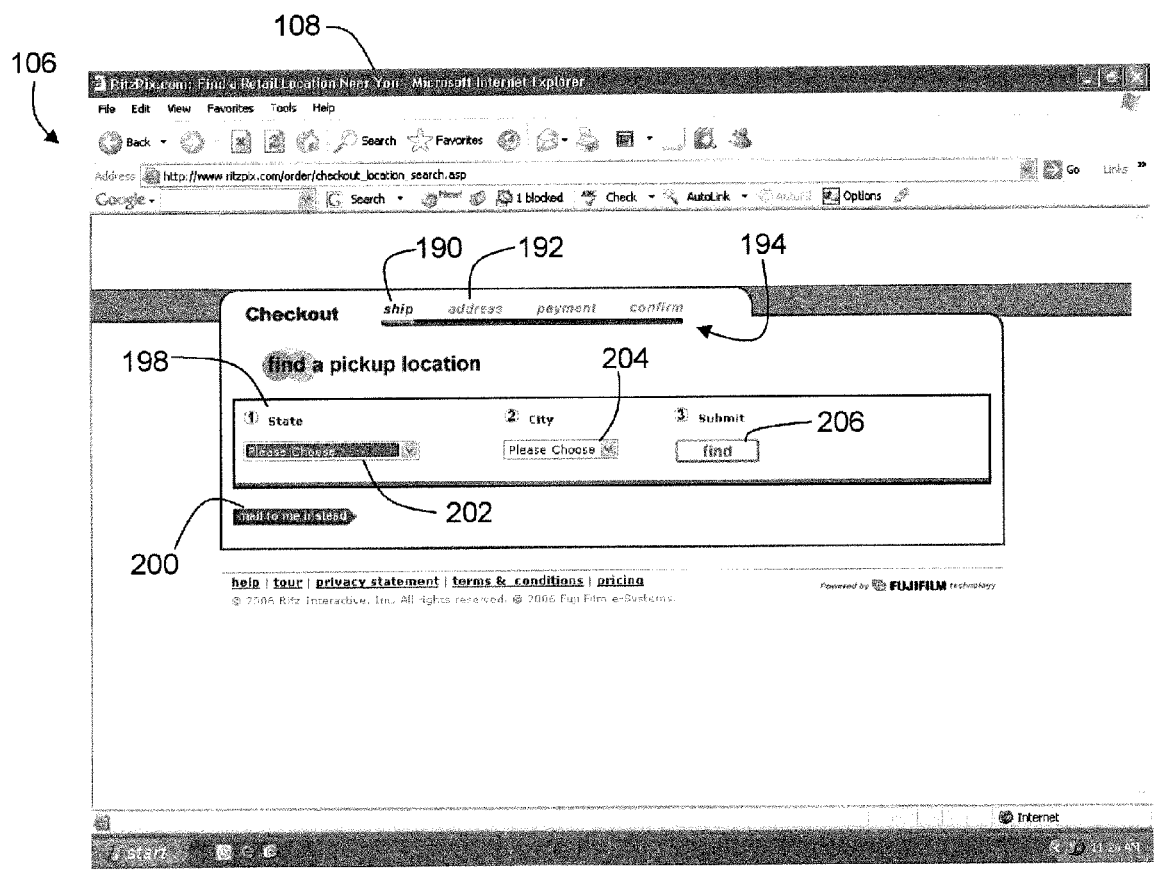

As best seen in FIG. 14, the user may then proceed to a shipping portion 190 and then to an address portion 192 of a checkout progression sequence 192 to select and establish a delivery criteria for calendar at step 196. In the shipping portion 190, the user may either search for a pick-up location 198 or have the calendar mailed to him or her using a "Mail To Me Instead" button 200. In order to search for a pickup location 198, a drop down menu 202 is provided to identify the state of the pick-up, and another drop down menu 204 is provided to identify a city that the pick-up will take place. A "Find" button 206 enables an execution command that operates to perform a search of potential pick-up locations using the city and state criteria selected in the drop down menus 202, 204, and display a list of the potential pick-up locations. The user then may select one of the listed pick-up locations and then proceed to the address portion 192 of the checkout progression sequence 194. On the other hand, the mail to me instead button 200 enables an execution command that operates to move the checkout process to the address portion 192 of the progression sequence 194, as best seen in FIG. 15.

Figure 15:
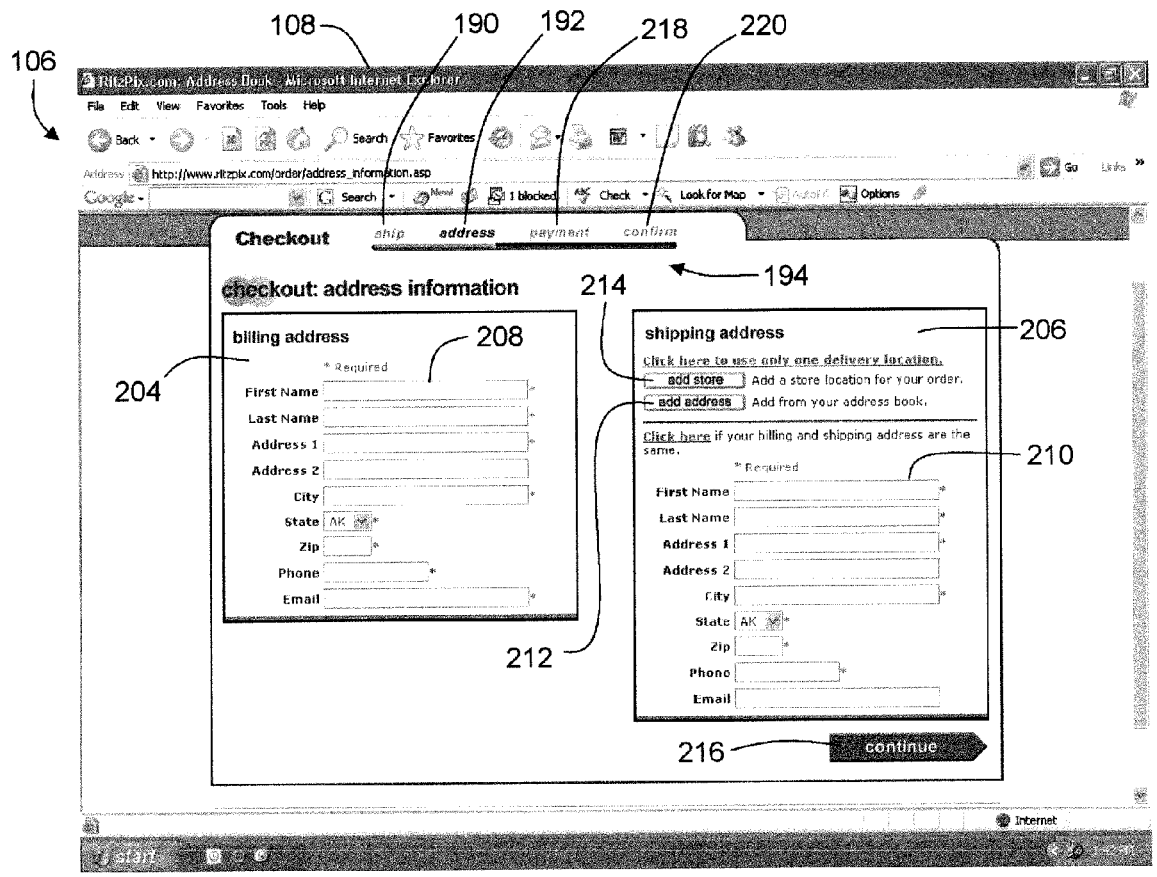

As best seen in FIG. 15, the address portion 192 of the checkout progression sequence 194 includes a billing address area 204 and a shipping address area 206. Billing address area 204 includes a plurality of entry fields 208 that allows the user to provide information related to the person who will be paying for the calendar included in the calendar print order data file. The shipping address area 206 also may include a plurality of entry fields 210 that allows the user to provide information related to the person who receives delivery of the calendar included in the calendar print order data file. Optionally, if the user selected the pick-up option from a store location using the pick-up location search tool 198 (FIG. 14), then the name and address of the selected store location will be shown in shipping address area 106. Further, an "Add Address" button 212 enables an execution command that operates to access a pre-established addresses located in an address book. An "Add Store" button 214 enables an execution command that operates to add a store name and address to the shipping address area 206 so that the ordered calendar can be picked-up from that location. A continue button 216 enables an execution command that operates to proceed to a payment portion 218 of the checkout progression sequence 194.

After the delivery criteria has been selected in shipping and address portions 190, 192 of the checkout progression sequence 194, the user may proceed to payment portion 218 of the checkout progression sequence 194 by selecting a "Continue" button 216 enables an execution command that calculates and displays a total cost based on the total number of items in the calendar print order data file, the selected delivery criteria, and the pricing information for each of the ordered calendars. The application then moves to a billing pane (not shown). In the billing pane displayed by the application, the user enters information that can be used by the photofinisher 14 to charge the user or a third-party designated by the user, or issue a bill to the user or third-party based on the total cost.

After the billing information has been selected, the application may proceed to a confirm portion 220 of the checkout progression sequence 194 to review all of the information previously entered during the checkout progression sequence 194. It will be understood that the user may also return to the previous portion of the checkout progression sequence 194 if something in the calendar print order data file needs to be modified.

As best seen in FIG. 5, the remote computer 12 then operates to communicate the calendar print order data file to photofinisher 14 using communication paths 58, 60, 66, 70 at step 222. The calendar print order data file is then uploaded to photofinisher 14 or server 102 at step 224, and the calendar print order data file is then saved on system memory 100 so that the order may be processed using printer 94 or image processing device 96. The printed calendar is then delivered to the user or third-party designated by the user using the selected delivery criteria at step 226.

The above described method allows the user to prepare the calendar print order on remote computer 12 using an Internet-based software program located on photofinisher 14 or server 102. To avoid complications and inconveniences of technologies such as Flash, Java, and ActiveX, the variable month cross-platform photo calendar building software discussed above uses rudimentary and therefore the most fully supported technologies available, HTML and JavaScript. The cross-platform photo calendar building software makes exclusive use of HTML and JavaScript for the benefit of cross-browser support, ease of use, with no download and/or installation of external software required for remote computer 12. In addition, the above described method facilitates the efficient building of a digital photo calendar by displaying the selected digital photos and the calendar image windows in the same application window, and allowing the digital photos to be moved to the calendar image windows using a drag and drop operation.

While the invention has been described with reference to specific embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method for ordering a print of a plurality of digitally represented still images on a calendar using a remote computer, the remote computer having a platform independent web application configured to communicate with a photofinisher server, through a network, and the calendar including a plurality of monthly calendar pages, the method comprising the steps of:

selecting a plurality of digitally represented still images using the remote computer;

displaying the plurality of selected digitally represented still images in an image tray pane;

displaying a calendar workspace pane including a calendar image window associated with each of the plurality of monthly calendar pages, wherein said image tray pane and said calendar workspace pane are displayed at the same time;

associating at least one of the plurality of selected digitally represented still images displayed in the image tray pane with each of the calendar image windows by dragging the selected digitally represented still image to the respective calendar image window, and then dropping the selected digitally represented still image in the respective calendar image window;

editing at least one of the plurality of selected digitally represented still images after the step of associating the at least one of the plurality of selected digitally represented still images with the respective calendar image window;

establishing a calendar print order data file which represents the association of the plurality of selected digitally represented still images with the calendar image windows; and communicating the calendar print order data file to the photofinisher server, wherein the photofinisher server receives the calendar print order data file and produces the print of the plurality of digitally represented still images on the plurality of monthly calendar pages, wherein each of the steps of the method are provided using a cross-platformed calendar building application resident on the photofinisher server, and wherein each of the steps in the method are executed using instructions in Hypertext Markup Language and JavaScript.

2. The method as recited in claim 1, further comprising selecting a calendar format.

3. The method as recited in claim 1, further comprising selecting a starting month for the calendar.

4. The method as recited in claim 1, wherein the image tray pane and the calendar workspace pane are displayed in a calendar creation tool pane.

5. The method as recited in claim 1, wherein the association of the at least one of the plurality of selected digitally represented still images displayed in the image tray pane with each of the calendar image windows is performed using an interface selection device.

6. The method as recited in claim 5 wherein the interface selection device is used to associate the at least one of the plurality of selected digitally represented still images displayed in the image tray pane with each of the calendar image windows by dragging the at least one of the plurality of selected digitally represented still images to the respective calendar image window, and then dropping the at least one of the plurality of selected digitally represented still images in the respective calendar image window.

7. The method as recited in claim 1, wherein the calendar workspace pane includes a calendar text window associated with each of the plurality of monthly calendar pages.

8. The method as recited in claim 7 further including entering text in each of the calendar text windows.

9. The method as recited in claim 1, wherein the editing includes rotating the at least one of the plurality of selected digitally represented still image images.

10. The method as recited in claim 1, further comprising uploading the plurality of digitally represented still images from the photofinisher server prior to the step of selecting the plurality of digitally represented still images using the remote computer.

11. The method as recited in claim 1, further comprising selecting a delivery criteria, wherein the calendar print order data file includes the selected delivery criteria.

12. The method as recited in claim 11, further comprising delivering the print of the plurality of digitally represented still images on the plurality of monthly calendar pages using the delivery criteria.

13. The method as recited in claim 1, wherein the network is the Internet.

14. The method as recited in claim 13, wherein the executable instructions are read by a web browser located on the remote computer.

15. The method as recited in claim 1, wherein the image tray pane is displayed in a first region of a display device, and wherein the calendar workspace pane is displayed in a second region of the display device.

16. The method as recited in claim 1, wherein the method is performed without downloading or installing external software on the remote computer.

17. A computer readable medium having computer-executable instructions for performing a method for ordering a print of a plurality of digitally represented still images on a calendar using a remote computer, the remote computer having a platform independent web application configured to communicate with a photofinisher through a network, and the calendar including a plurality of monthly calendar pages, the method comprising the steps of:

selecting a plurality of digitally represented still images using the remote computer;

displaying the plurality of selected digitally represented still images in an image tray pane;

displaying a calendar workspace pane including a calendar image window associated with each of the plurality of monthly calendar pages, wherein said image tray pane and said calendar workspace pane are displayed at the same time;

associating at least one of the plurality of selected digitally represented still images displayed in the image tray pane with each of the calendar image windows by dragging the selected digitally represented still image to the respective calendar image window, and then dropping the selected digitally represented still image in the respective calendar image window;

editing at least one of the plurality of selected digitally represented still images after the step of associating the at least one of the plurality of selected digitally represented still images with the respective calendar image window;

establishing a calendar print order data file which represents the association of the plurality of selected digitally represented still images with the calendar image windows; and communicating the calendar print order data file to the photofinisher, wherein the photofinisher receives the calendar print order data file and produces the print of the plurality of digitally represented still images on the plurality of monthly calendar pages, wherein each of the steps of the method are provided using a cross-platformed calendar building application resident on the photofinisher server, and wherein each of the steps in the method are executed using instructions in Hypertext Markup Language and JavaScript.

18. The computer readable medium as recited in claim 17, wherein the method is performed without downloading or installing external software on the remote computer.

19. A system for ordering a print of a plurality of digitally represented still images on a calendar, the calendar including a plurality of monthly calendar pages, the system, comprising:

a remote computer; and a photofinisher server connected to the remote computer through a network, the photofinisher server including a processor and a memory, a cross-platformed calendar building application being stored in said memory and programmed to:

allow a plurality of digitally represented still images to be selected using a platform independent web application on the remote computer;

display on the remote computer the plurality of selected digitally represented still images in an image tray pane;

display on the remote computer a calendar workspace pane including a calendar image window associated with each of the plurality of monthly calendar pages, wherein said image tray pane and said calendar workspace pane are displayed at the same time;

associate at least one of the plurality of selected digitally represented still images displayed in the image tray pane with each of the calendar image windows by using the remote computer to drag the selected digitally represented still image to the respective calendar image window, and then drop the selected digitally represented still image in the respective calendar image window;

edit at least one of the plurality of selected digitally represented still images after the step of associating the at least one of the plurality of selected digitally represented still images with the respective calendar image window;

establish a calendar print order data file that represents the association of the plurality of selected digitally represented still images with the calendar image windows; and communicate the calendar print order data file from the remote computer to the photofinisher server, wherein the photofinisher server receives the calendar print order data file and produces the print of the plurality of digitally represented still images on the plurality of monthly calendar pages, wherein the cross-platformed calendar building application is programmed to perform each of the above steps using instructions in Hypertext Markup Language and JavaScript.

20. The system as recited in claim 19, wherein the remote computer is configured to perform the respective steps without downloading or installing external software on the remote computer.

* * * * *